United States Patent [19]

Berman et al.

[11] Patent Number: 4,749,988
[45] Date of Patent: Jun. 7, 1988

[54] NON-INVASIVE LIQUID LEVEL SENSOR

[75] Inventors: Allan Berman, Sunnyvale; Henry R. Miranda, Palo Alto, both of Calif.

[73] Assignee: Imtec Products, Inc., Sunnyvale, Calif.

[21] Appl. No.: 932,573

[22] Filed: Nov. 20, 1986

[51] Int. Cl.⁴ ............................................. G08B 21/00
[52] U.S. Cl. .................................... 340/618; 340/620; 73/290 R; 73/304 C
[58] Field of Search ............... 340/618, 612, 621, 622, 340/620; 73/291, 861.08, 304 C, 49.3, 49.2; 361/284, 278; 324/61 R, 290 V, 61 C; 137/392, 393

[56] References Cited

U.S. PATENT DOCUMENTS

| | | | |
|---|---|---|---|
| 3,588,859 | 6/1971 | Petree | 340/870.37 |
| 4,002,996 | 1/1977 | Klebanoff | 73/304 C |
| 4,630,245 | 12/1986 | Dam | 340/621 |

*Primary Examiner*—Joseph A. Orsino
*Assistant Examiner*—Jill D. Jackson

*Attorney, Agent, or Firm*—Harris Zimmerman; Howard Cohen

[57] ABSTRACT

A non-invasive liquid level sensor assembly includes a pair of conductive band electrodes oriented in parallel, narrowly spaced relationship and disposed so that the gap between the electrodes corresponds to the liquid surface level to be detected. The electrodes are secured to the outer surface of a liquid container, and connected to a capacitive detector device which measures the change in electrical capacity between the conductors as the liquid rises or falls past the level of the gap between the electrodes. A shield electrode is also provided, disposed outwardly of and concavely about the sensing electrodes to eliminate sensitivity to masses outside of the container. In one embodiment the electrodes are secured with a sealed, arcuate housing which is adapted to be permanently or temporarily secured to the exterior of a liquid container by adhesive, removable straps, or the like. In another embodiment adapted for double-walled containers, the sensing electrodes are secured to the outer surface of the inner container, and the shield electrode is secured to the confronting interior surface of the outer container.

12 Claims, 2 Drawing Sheets

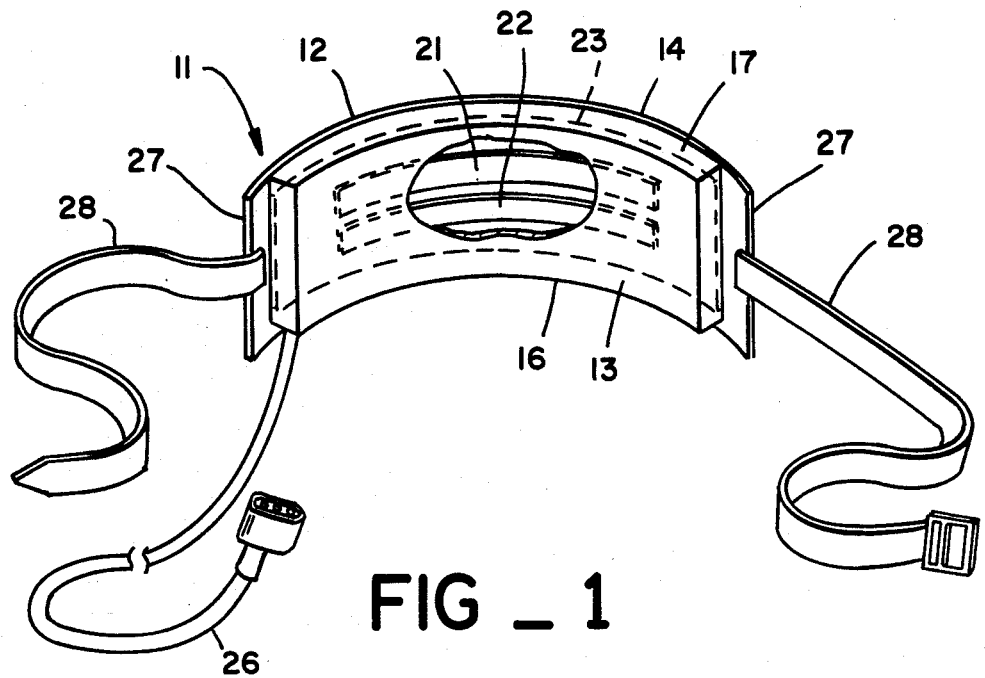
FIG _ 1
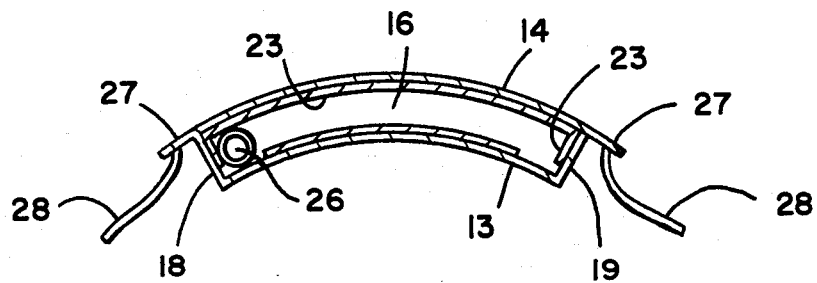
FIG _ 2
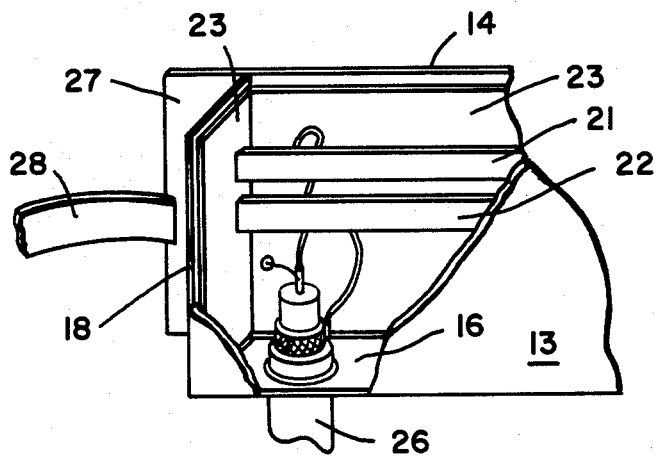
FIG _ 3

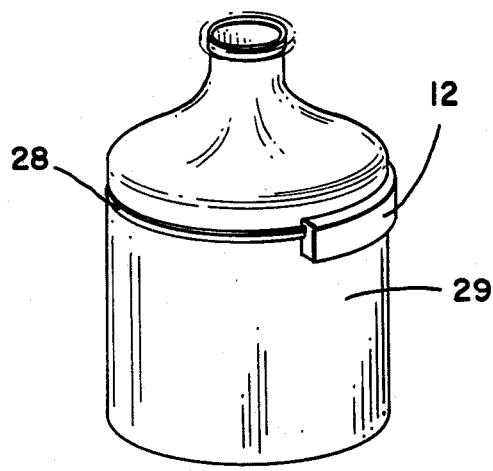
FIG_4
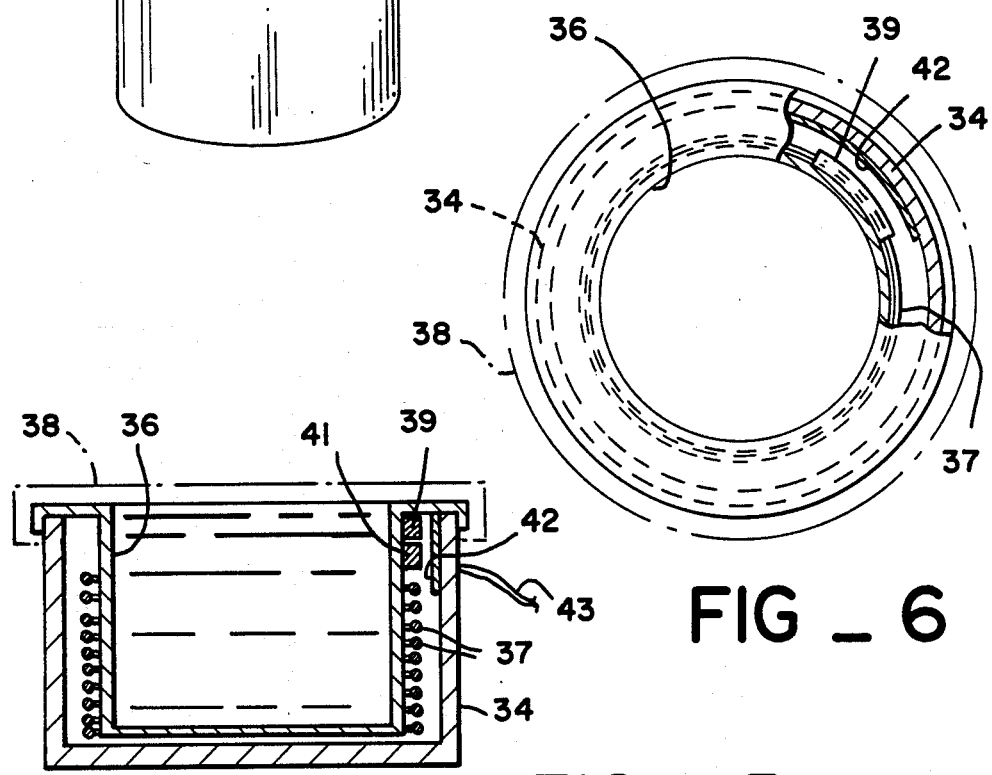
FIG_6
FIG_5
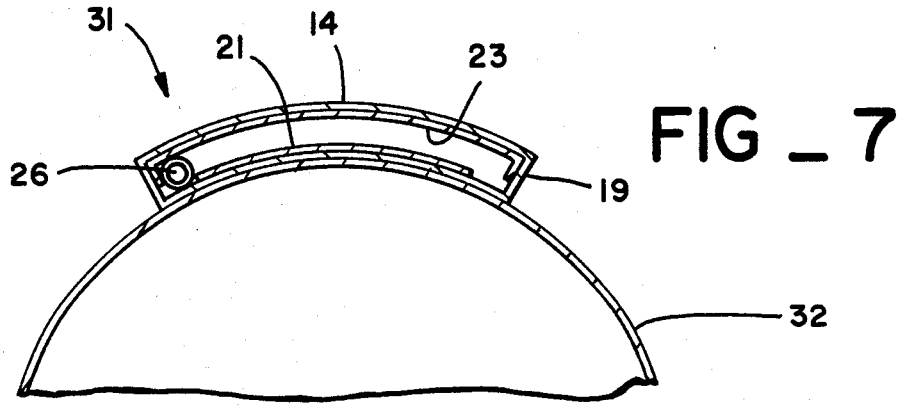
FIG_7

NON-INVASIVE LIQUID LEVEL SENSOR

BACKGROUND OF THE INVENTION

In the processing industries many substances in liquid form are used in manufacturing processes to fabricate finished products. In the production of integrated circuits and the like, the liquids used often have chemical properties that render them extremely difficult to handle, including high toxicity, high corrosivity, high vapor pressure, and high flammability. In addition, it is often absolutely necessary to maintain extreme purity of the chemicals. Otherwise, impurities introduced into the integrated circuit wafers will render the devices inoperative or defective.

Generally speaking, the process chemicals used in semiconductor and integrated circuit manufacturing are stored and used in containers or tanks formed of corrosion resistant materials that do not introduce impurities into the chemicals, such as glass, quartz, and occasionally stainless steel. The tanks are sealed from contamination from the ambient air, and the liquids are transferred through closed pumping and pressure systems using inert gases. Thus the amounts of liquids in the containers are generally not directly observable. Furthermore, the processing machines for integrated circuits and the like have reached a level of automation which requires constant monitoring of the amounts of process chemicals available to the machines and in use within the machines.

Also, it is important that the amount of process chemical being stored in tanks is well known and controlled, to prevent overflow and spillage of these dangerous substances, to assure delivery of the proper amount of the substances to the fabrication apparatus when required, and to prevent unsafe storage conditions. For example, some process materials will explode spontaneously if the liquid level within the container falls below a minimum amount.

The task of sensing liquid levels within a container or tank or process chamber without contaminating the liquid is problematic at best. Any probe placed within the liquid must be cleaned more thoroughly than a surgical instrument, and this restriction is not consonant with production floor manufacturing. In the prior art, techniques such as weigh scales to check the net mass of liquid retained in a container have been used, but this is an expensive approach, both in equipment investment and in labor devoted to monitoring and maintaining the scales. Other techniques include the use of an inert gas such as nitrogen bubbled through the liquid, with a detector to sense the change in fluid resistance in the gas when the bubbling orifice extends above the liquid surface. Capacitive detectors have also been used, generally involving a conductive probe disposed within the container, and a conductive electrode secured about the container. Capacitive sensors are prone to false readings, due for example to large masses being moved about the area of the container being monitored. Both these techniques involve placing a foreign object in the container, with the attendant problems of contamination. Clearly there is a need in the art for a non-invasive sensing system for detecting liquid level within a container; that is, a system that is relatively inexpensive, reliable, and accurate.

SUMMARY OF THE PRESENT INVENTION

The present invention generally comprises a liquid level sensing device adapted for use with containers of process chemicals and the like. It provides a means of sensing the liquid level within the container without introducing any foreign material or object into the liquid or the container, and it reliably detects a predetermined liquid level. The sensor is inexpensive and easy to use, and is adapted to be interchangeably secured to any container, tank, or process chamber requiring monitoring.

The non-invasive liquid level sensor assembly includes a pair of conductive band electrodes oriented in parallel, narrowly spaced relationship and disposed so that the gap between the electrodes corresponds to the liquid level to be monitored. The electrodes are secured to the outer surface of a liquid container, and connected to a capacitive detector device which measures the change in electrical capacity between the conductors as the liquid rises or falls past the level of the gap between the electrodes. A shield electrode is also provided, disposed outwardly of and concentrically about the sensing electrodes to eliminate sensitivity to masses outside of the container. In one embodiment the electrodes are secured within a sealed, curved housing which is adapted to be permanently or temporarily secured to the exterior of a liquid container by adhesive, removable straps, or the like. In another embodiment adapted for double-walled containers, such as a quartz heated retort, the sensing electrodes are secured to the outer surface of the inner container, and the shield electrode is secured to the confronting interior surface of the outer container.

BRIEF DESCRIPTION OF THE DRAWING

FIG. 1 is a perspective view of one embodiment of the capacitive liquid level sensing device of the present invention.

FIG. 2 is a cross-sectional top view of the embodiment of the invention depicted in FIG. 1.

FIG. 3 is an enlarged, cutaway perspective view of the connection of the signal cable to the electrodes of the present invention.

FIG. 4 is a perspective view of the embodiment of FIGS. 1-3 secured to a tank to monitor a liquid level therein.

FIG. 5 is a cross-sectional side elevation of a further embodiment of the capacitive liquid level sensor of the present invention.

FIG. 6 is a partially cutaway top view of the embodiment of the invention depicted in FIG. 5.

FIG. 7 is an enlarged cross-sectional top view of another embodiment of the present invention, shown adhered to the sidewall exterior of a liquid containing tank.

DESCRIPTION OF THE PREFERRED EMBODIMENT

The present invention generally comprises a non-invasive liquid level monitoring device. The most significant general features of the invention are that it is adapted to be secured to the outer surface of a liquid tank or container, so that no contamination is introduced into the liquid. The device monitors the liquid level using capacitive conductors exterior to the container, and further includes a shield electrode disposed outwardly of the conductors to prevent false reading due changing or moving masses adjacent to the container being monitored. Various embodiments of the invention includes devices adapted to be removably secured to a tank or container and interchangeably used with a plurality of containers, a device adapted to be permanently secured to a container such as a holding tank in a integrated circuit wafer processing apparatus, and a device adapted to be used with a double walled container such as a quartz heated retort.

With regard to FIGS. 1 and 2, one embodiment 11 of the liquid level monitoring device of the invention comprises a housing 12 configured to be secured in flush relationship to the exterior surface of a typical storage or process tank or container. The housing is provided with a generally curved configuration to conform to the typical cylindrical tank, although it may be appreciated that it is within the scope of the invention to provide other curvatures or planar configurations to conform to any tank outer surface. An inner curved wall 13 and an outer curved wall 14 are disposed in substantially concentric, radially spaced relationship, the outer wall subtending an arc slightly greater than that of the inner wall. Top and bottom walls 17 and 16, respectively, extend between confronting edges of the inner and outer walls, and end walls 18 and 19 join the confronting side edges to form a sealed, curved housing having the curvature of a partial cylindrical segment. The housing is formed entirely of non-conductive materials.

Within the housing a pair of sensing electrodes 21 and 22 extend longitudinally and are arranged in parallel, spaced apart relationship. The electrodes comprise thin bands of conductive material such as metal foil or the like, and are secured to the inside surface of the wall 13 along lines of intersection formed by the wall 13 and planes extending perpendicular thereto and transverse to the axis of the cylindrical segment defined by the wall. Also secured within the housing 12 is a shield electrode 23 extending longitudinally and secured to the inner surfaces of the walls 14, 18, and 19. The shield electrode covers substantial portions of the walls 14, 18, and 19, and acts to shield the sensing electrodes 21 and 22, as will be explained in the following description. The shield electrode 23 may also be formed of metal foil material, and all of the electrodes are secured to their respective wall surface portions by adhesive material.

A coaxial signal cable 26 extends through an opening in the wall 16 adjacent to the end wall 18. The inner coaxial conductor is connected to the upper sensing electrode 21, as shown in FIG. 3, and the outer coaxial conductor is connected to the shield electrode 23. The outer braid conductor of the coaxial cable is connected to the lower sensing electrode 22. The cable 26 extends to a capacitance sensing device, and arranged to measure the change in capacitance between the sensing electrodes 21 and 22 as the liquid level within the container or tank being monitored rises and falls past the gap defined between the sensing electrodes. It may be appreciated that the two parallel sensing electrodes exhibit an intrinsic mutual capacitance, and it is well known that this capacitance is significantly altered by the liquid level rising or falling past the gap between the sensing electrodes. This phenomenon occurs to a measurable degree despite the nature of the liquid itself, although the conductivity or dielectric nature of the liquid affects the magnitude of the change in capacitance. In any case the effect is easily measured, and the gap between the sensing electrodes defines the liquid level within the container that is monitored by the present invention.

There are known in the prior art several techniques for measuring the change in capacitance indicative of the change in liquid level past the sensing gap. One technique involves applying an AC voltage to the sensing electrodes, and measuring the amount of capacitive current that flows as a result. An example of this approach is found in the Boonton 75 D Bridge Capacitance Meter. Another common technique involves applying a DC voltage to the sensing electrodes. This may be done for a fixed length of time, followed by measurement of the voltage to which the sensing electrodes are charged. Alternatively, the time required for the capacitor formed by the sensing electrodes to reach a predetermined voltage can be measured. An instrument embodying these techniques is the B & K Digital Capacitance Meter Model 830.

Another form of capacitance measurement involves connecting the capacitance between the sensing electrodes into an oscillator circuit, and measuring its effect on the oscillator For example, the variation in capacitance can alter the frequency of the output signal, and a shift in output frequency indicates a change in liquid level past the sensing gap. In a similar approach, the electrodes form part of a fixed frequency feedback circuit which inhibits oscillation until a predetermined capacitance level is attained, indicative of the liquid level bridging the sensing gap. An instrument embodying this approach is the Princo Capacitance Level Sensor Models L2500 and L2510.

Due to the curvature of the sensing electrodes 21 and 22 about a portion of the container, the electric field established by a voltage differential applied to the electrodes extends into the volume of the closed container, even though there is no portion of the sensor actually extending into the container. Thus the electrodes are very sensitive to changes of the liquid level past the sensing gap, as the liquid must pass through the electric field and alter the dielectric constant of the media through which the field propagates. Furthermore, the shield electrode disposed outwardly of the sensing electrodes prevents projection of the electric field beyond the outer wall and end walls of the housing 12. Thus the invention is extremely insensitive to movement and changes of masses adjacent to the container being monitored. This is deemed to be a significant advantage over prior art capacitive sensors, which often produce erroneous readings due to the filling or emptying of adjacent tanks, the approach of workers bodies, stray electric fields, and the like.

As noted previously, the outer wall 14 subtends an angle greater than the inner wall 13, resulting in the extension of tab portions 27 outwardly from the end walls 18 and 19. A pair of straps 28 are secured to the tab portion 27, and are provided with an adjustable closure adapted to join the straps about a tank or container 29, as shown in FIG. 4. Thus the housing 12 is secured to the vessel to be monitored in a removable fashion, and the device easily may be removed and re-secured to another vessel, or placed at a different height on the same vessel. There are several advantages to this construction. for example, the invention may be used to monitor the minimum usable liquid level in a supply tank, and the device can be shifted to a new supply tank when the liquid in the current tank is exhausted. Likewise, when a holding tank in an integrated circuit wafer processing apparatus is removed for cleaning or maintenance, the level sensing device attached thereto is easily removed and secured to the replacement tank. Also, the liquid level being monitored may easily be altered by changing the height of placement of the invention on the tank or container. It may also be appreciated that more than one sensing device of the present invention can be used in conjunction with one container, so that, for example, both the minimum and maximum permissible liquid levels in the container can be monitored.

Another embodiment similar to the device described above is shown in FIG. 7, and similar reference numerals indicate similar components. The device 31 of FIG. 7 is adapted to be adhered to a tank 32 through the use of double-sided adhesive tape, permanent adhesive, or the like. The tab portions 27 and the straps 28 are absent, otherwise the construction is the same as in FIGS. 1–3. The device 31 is adapted for permanent or semi-permanent installation, in situations in which removal and re-installation is not desirable or advisable.

A further embodiment of the present invention, shown in FIGS. 5 and 6, is adapted for use in conjunction with double wall liquid containers. One example of such a container is a quartz heated retort, used in the semiconductor processing industry to heat processing solvents and other liquids to application temperatures (up to 250° C. or more) without introducing any deleterious impurities into the liquid. In a schematic representation, an outer supporting container 34 is generally cylindrical, and the quartz container 36 is dimensioned to be received therein. The quartz container is also generally cylindrical, with an outer upper flange adapted to impinge on the upper edge of the container 34 to support the container 36 and define an insulating space between the confronting walls of the two containers. An electrical heating coil 37 or similar heating device is engaged about the outer surface of the periphery of the container 36. The container assembly is sealed by a top 38 to eliminate airborne contamination.

To measure a predetermined liquid level within the inner container 36, a pair of sensing electrodes 39 and 41 are secured to the outer surface of the container 36. The electrodes 39 and 41 are arranged similarly to the electrodes of the previous embodiment, and are formed of bands of conductive metal foil or the like adhered to the outer surface of the container 36 in parallel, closely spaced configuration, with the gap therebetween defining the liquid surface level to be monitored. The electrodes may also be formed of wires or printed conductive stripes. A shield electrode 42 is also provided, and is adhered to the inner surface of the outer container 34 in confronting, concave relationship to the sensing electrodes 39 and 41. The shield electrode may also be formed of a conductive foil.

It may be appreciated that this embodiment functions in the same manner as the embodiment of FIGS. 1–3. The capacitance of the sensing electrodes 39 and 41 is monitored continuously, and a change in liquid level past the sensing gap of the electrodes causes a sufficient change in capacitance to be detected easily by the methods and devices described previously. The embodiment of FIGS. 5 and 6 is a generally permanent installation, and may be used not only for the specialized quartz heated container, but also for any tank or container which requires long-term monitoring, or which is not adapted to be monitored by the externally applied embodiments of FIGS. 1–4 and FIG. 7. In all the embodiments there are important common characteristics: the provision of an inexpensive and reliable device to monitor a critical liquid surface level within a container, without introducing any foreign material into the container or liquid. It may be apparent to one skilled in the art that several devices of the present invention may be used on the same container, to detect maximum and minimum critical levels, to detect minimally sufficient volumes of liquid to complete a manufacturing process step, and the like.

We claim:

1. A non-invasive liquid level sensor device for detecting a predetermined liquid surface level within a container, comprising; a pair of sensing electrodes adapted to be secured in conformance to the exterior of the container, said sensing electrodes including a pair of conductive bands disposed in parallel, narrowly spaced relationship to define a gap therebetween, said gap extending generally in the plane of the liquid surface level to be detected, means for connecting said sensing electrodes to a capacitance sensing instrument to measure the change in capacitance of said sensing electrodes as the liquid level rises and falls past said gap, and a shield electrode disposed outwardly of said sensing electrodes with respect to the container, said shield electrode extending continuously beyond the length and breadth of said sensing electrodes to prevent conditions external to said container from affecting said capacitance of said sensing electrodes, said means for connecting said sensing electrodes to a capacitance sensing instrument comprising a shielded cable having internal conductors connected to said sensing electrodes, and an outer shield conductor connected to said shield electrode in grounding configuration.

2. The non-invasive liquid level sensor device of claim 1, further including a sealed housing, said sensing electrodes and said shield electrode mounted within said housing.

3. The non-invasive liquid level sensor device of claim 2, further including means for removably securing said housing to the exterior of the container.

4. The non-invasive liquid level sensor device of claim 2, wherein said housing includes first and second side walls disposed in confronting, spaced apart relationship, said first side wall being adapted to impinge upon the container, said first side wall having a curvature complementary to the outer surface portion of the container to which it is secured.

5. The non-invasive liquid level sensor device of claim 4, wherein said sensing electrodes are secured within said housing to said first side wall.

6. The non-invasive liquid level sensor device of claim 5, wherein said second side wall is curved in parallel conformance to said first side wall, and said shield electrode is secured within said housing to said second side wall.

7. The non-invasive liquid level sensor device of claim 6, wherein said shield electrode extends to cover substantially all the interior surface of said second side wall.

8. The non-invasive liquid level sensor device of claim 7, wherein said housing further includes a pair of end walls joining confronting end edge portions of said first and second side walls, and said shield electrode extends continuously from said interior surface of said second side wall to cover substantially all the interior surfaces of said end walls.

9. The non-invasive liquid level sensor device of claim 4, wherein said first and second side walls are provided with the curvature of a cylindrical segment, said second side wall disposed concentrically about said first side wall.

10. The non-invasive liquid level sensor device of claim 3, wherein said means for removably securing said housing includes a pair of straps, each extending from one end of said housing, said straps adapted to circumscribe the container to secure said housing thereto.

11. The non-invasive liquid level sensor device of claim 1, wherein the container includes inner and outer spaced container walls, and said sensing electrodes are secured to the outer surface of the inner container wall, and said shield electrode is secured to the inner surface of the outer container wall.

12. The non-invasive liquid level sensor device of claim 2, further including adhesive means for securing said housing to the outer peripheral surface of the container with said gap disposed at a predetermined level corresponding to the liquid surface level to be monitored.

* * * * *